(12) United States Patent
Idaka (10) Patent No.: US 6,902,484 B2
(45) Date of Patent: Jun. 7, 2005

(54) GAME MACHINE AND NETWORK SYSTEM FOR SETTING UP GAME ENVIRONMENT THEREOF

(75) Inventor: Mitsuhira Idaka, Tokyo (JP)

(73) Assignee: Konami Corporation, Tokyo (JP)

( * ) Notice: Subject to any disclaimer, the term of this patent is extended or adjusted under 35 U.S.C. 154(b) by 0 days.

(21) Appl. No.: 09/855,020

(22) Filed: May 15, 2001

(65) Prior Publication Data

US 2002/0022521 A1 Feb. 21, 2002

(30) Foreign Application Priority Data

May 15, 2000 (JP) ........................................ 2000-141672

(51) Int. Cl.$^7$ ................................................ A63F 9/24
(52) U.S. Cl. .......................................... 463/43; 463/23
(58) Field of Search ....................... 463/23, 29; 700/92; 382/115; 713/182, 186

(56) References Cited

U.S. PATENT DOCUMENTS

| | | | | | |
|---|---|---|---|---|---|
| 5,012,522 | A | * | 4/1991 | Lambert | 382/2 |
| 5,432,864 | A | * | 7/1995 | Lu et al. | 382/118 |
| 5,779,549 | A | * | 7/1998 | Walker et al. | 463/42 |
| 5,813,913 | A | * | 9/1998 | Berner et al. | 463/40 |
| 5,917,725 | A | * | 6/1999 | Thacher et al. | 364/410.1 |
| 6,099,408 | A | * | 8/2000 | Schneier et al. | 463/29 |
| 6,110,041 | A | * | 8/2000 | Walker et al. | 463/42 |
| 6,142,876 | A | * | 11/2000 | Cumbers | 463/25 |
| 6,183,362 | B1 | * | 2/2001 | Boushy | 463/25 |
| 6,224,486 | B1 | * | 5/2001 | Walker et al. | 463/23 |
| 6,352,479 | B1 | * | 3/2002 | Sparks, II | 463/29 |

FOREIGN PATENT DOCUMENTS

| | | |
|---|---|---|
| CN | 1158458 A | 12/1996 |
| CN | 1220433 A | 12/1998 |
| JP | 5-35877 A | 2/1993 |
| JP | 8-503087 A | 4/1996 |
| JP | 11-85705 A | 3/1999 |
| JP | 11-253657 A | 9/1999 |
| JP | 2000-308764 A | 11/2000 |
| JP | 2001-300130 A | 10/2001 |
| WO | WO 99/10061 | 3/1999 |

OTHER PUBLICATIONS ngTCS from NetGames USA–Female Frag Fest 99 Finals Prizes, [http://stats1.zone.com/tournaments/GroundZero/FFF99/prizes.html], pp 1–3.*

* cited by examiner

Primary Examiner—Mark Sager
(74) Attorney, Agent, or Firm—Sughrue Mion, PLLC (57) ABSTRACT

A game player who faces a game machine is captured by a camera, and the game player is individually identified based on the image. Personal information of the identified game player (information regarding a skill level of the player, information regarding the progress status of the game, information regarding the number of acquired tokens, and information regarding the growth status in raising games) is read out from data storage. Based on the personal information which has been read out, a game environment in accordance with the personal information of the game player is automatically set up. During the game the game status is monitored, and based on the monitoring information, personal information of the game player is automatically generated and stored in the data storage.

14 Claims, 3 Drawing Sheets

GAME MACHINE AND NETWORK SYSTEM FOR SETTING UP GAME ENVIRONMENT THEREOF

BACKGROUND OF THE INVENTION

The present invention relates to a game machine which allows an automatic setup of a game environment depending on a game player, and to a network system for setting up the game environment thereof.

When starting a game on a game machine, for example, it has been such that the game player manually sets up by himself a game environment suitable for himself each time he starts the game.

However, the problem is that it is very cumbersome for the game player to manually set up by himself the game environment each time when he starts the game, as described above.

SUMMARY OF THE INVENTION

The present invention has been made to solve the above problem, and an object thereof is to provide a game machine which allows an automatic setup of a game environment suitable for the game player, and a network system for setting up the game environment thereof.

In order to achieve the above object, according to the present invention, there is provided a game machine comprising:

a player identifier, which identifies a player who wants to play a game;

a data storage, which stores personal information of a plurality of players which have been played the game; and a game environment arranger, which reads out the personal information of the player identified by the player identifier from the data storage, and automatically sets up a game environment based on the read out personal information.

In this configuration, when the game player is individually identified by the player identifier, the game environment arranger reads out from the data storage the personal information of the game player who has been individually identified, and automatically sets up a game environment in accordance with the personal information of the game player based on the personal information Therefore, a game environment in accordance with the game player automatically set up. Accordingly, the game player is saved the trouble of manually setting up a game environment suitable for himself before starting the game, thus being allowed to enjoy the game with more ease.

Preferably, the player identifier identifies the player using image recognition techniques.

In this configuration, a medium for performing personal identification, such as an ID card, is not required, and thus, the game player need not carry the medium for personal identification. In addition, the problem that the personal information cannot be retrieved in case of damage to or loss of the medium, etc. is avoided. In addition, the game player does not suffer from the unpleasant feeling associated with fingerprint recognition, etc.

Preferably, the game machine further comprises:

a game monitor, which monitors status of the game played by the player to generate monitoring information; and a personal information generator, which generates new personal information of the player based on the monitoring information, and stores the new personal information in the data storage.

In this configuration, since the personal information of the game player is automatically generated and stored in the data storage, for example, when the game is finished, the game player is saved the trouble of generating his self personal information, thus being allowed to enjoy the game with more ease.

Preferably, the game machine further comprises an information communicator, which communicates the personal information stored in the data storage with another game machine connected to the game machine.

In this configuration, since exchange of personal information of game players among game machines can be attained, a game environment suitable for the game player can be automatically set up similarly on any of the plurality of game machines which are signal-connected.

Preferably, the game machine further comprises a level determiner, which automatically determines a skill level of the player to generates skill level information, based on the monitoring information. Here, the personal information generator incorporates the skill level information to the personal information. And the game environment arranger automatically reads out personal information of another player stored in the data storage as an opponent in a multi-player game, based on the skill level information of the player.

In this configuration, since the skill level of the game player can be automatically determined, an opponent in accordance with the skill level of the game player can be selected more appropriately, allowing a more enjoyable playing of the game.

Preferably, the personal information includes at least one of information regarding a skill level of the player, information regarding progress status of the game, information regarding the number of tokens acquired in the game, and information regarding growth status in a raising game.

According to the present invention, there is also provided a network system for setting up a game environment, comprising:

a common host apparatus;

a plurality of game machines communicatively connected to the host apparatus;

a player identifier, which is provided in at least one of the host apparatus and game machines, and identifies a player who wants to play a game, the player identifier provided;

a data storage, which is provided in the host apparatus, and stores personal information of a plurality of players which have been played the game;

a data communicator, which is provided in the host apparatus, and transmits the personal information of the player identified by the player identifier, from the data storage to at least one of the game machines; and a game environment arranger, which is provided in the respective game machines, receives the personal information transmitted from the host apparatus, and automatically sets up a game environment based on the received personal information.

In this configuration, personal information of game players is unitarily stored in the host apparatus, so that the personal information of the game players can be distributed to each of the game machines. In a case where a plurality of game machines of the same type are provided in a game center, the game players can be allocated as desired to each of the game machines, achieving equivalent operation rates for the game machines of the same type.

Preferably, each of the game machine includes:

a game monitor, which monitors status of the game played by the player to generate monitoring information;

a personal information generator, which generates new personal information of the player based on the monitoring information; and an information communicator, which transmits the new personal information to the data storage in the host apparatus.

In this configuration, the game player is saved the trouble of generating the personal information by himself.

Preferably, the host apparatus and the respective game machines are connected via the Internet to play a network game provided on the Internet.

In this configuration, a game environment suitable for the game player can be automatically set up when playing the network game on the Internet as well, enhancing the advantage. Furthermore, the game player is allowed to start the game with ease, with a game environment suitable for himself automatically set up, on any of the game machines communicatively connected to the host apparatus via the Internet communications network.

Preferably, the player identifier identifies the player using image recognition techniques.

In this configuration, a medium for performing personal identification, such as an ID card, is not required, and thus, the game player need not carry the medium for personal identification. In addition, the problem that the personal information cannot be retrieved in case of damage to or loss of the medium, etc. is avoided. In addition, the game player does not suffer from the unpleasant feeling associated with fingerprint recognition, etc.

Preferably, each of the game machines includes a level determiner, which automatically determines a skill level of the player to generates skill level information, based on the monitoring information. Here, the personal information generator incorporates the skill level information to the personal information. And the game environment arranger automatically receives personal information of another player stored in the data storage as an opponent in a multi-player game, based on the skill level information of the player.

In this configuration, since the skill level of the game player can be automatically determined, an opponent in accordance with the skill level of the game player can be selected more appropriately, allowing a more enjoyable playing of the game.

Preferably, the personal information includes at least one of information regarding a skill level of the player, information regarding progress status of the game, information regarding the number of tokens acquired in the game, and information regarding growth status in a raising game.

In this specification, game machines are defined as any game machines which allow the playing of games, including personal computers, etc. as well as game machines for commercial use and game machines for household use.

BRIEF DESCRIPTION OF THE DRAWINGS

The above objects and advantages of the present invention will become more apparent by describing in detail preferred exemplary embodiments thereof with reference to the accompanying drawings, wherein like reference numerals designate like or corresponding parts throughout the several views, and wherein.

DETAILED DESCRIPTION OF THE PREFERRED EMBODIMENTS

Embodiments of the present invention will be described below with reference to the accompanying drawings.

Figure 1:
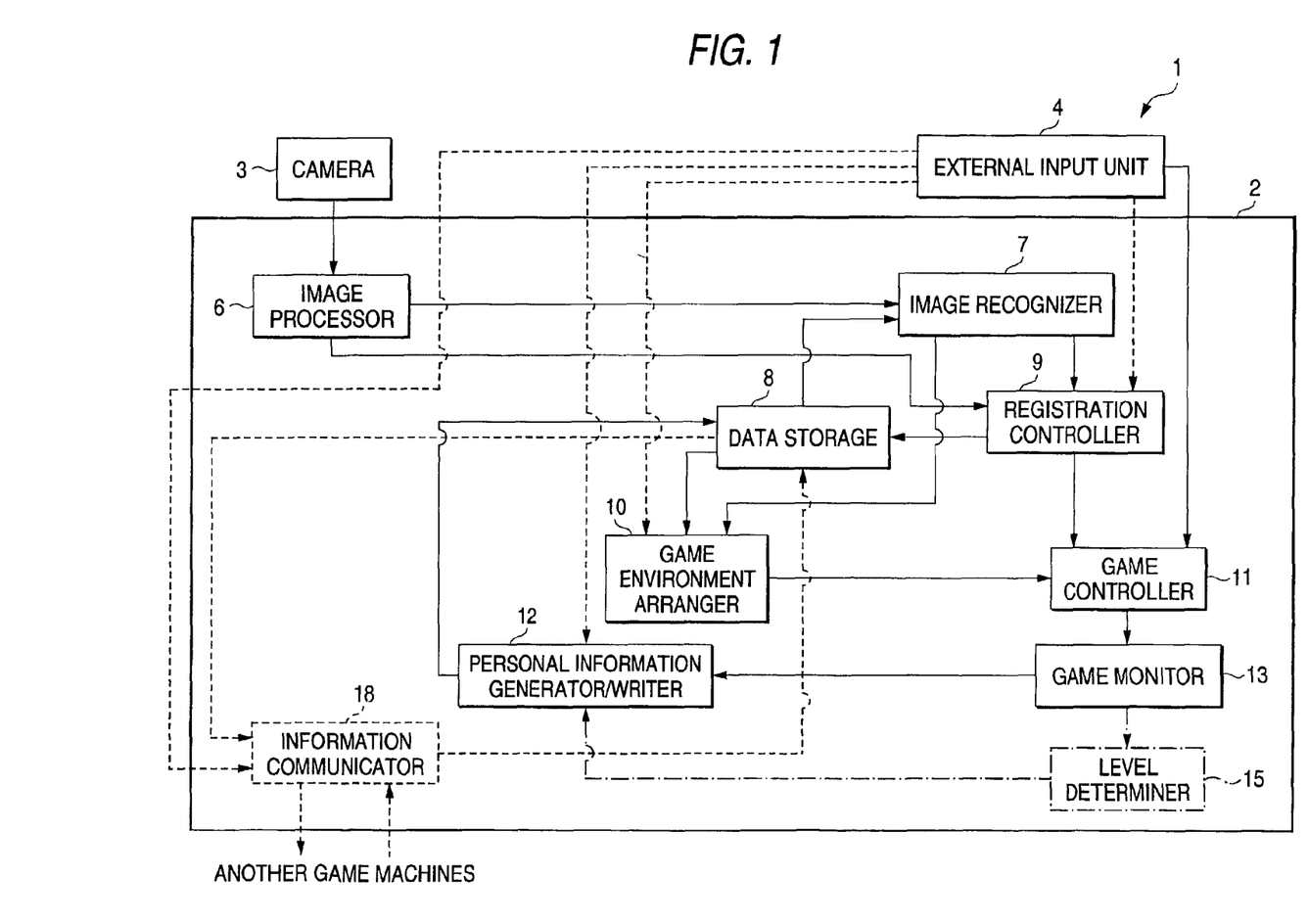
FIG. 1 is a block diagram showing essential components of the game machines according to first to third embodiments of the invention.

FIG. 1 shows, by solid lines, essential components in a game machine according to a first embodiment of the present invention. The game machine 1 is constructed so as to allow the playing of games, in the form of a personal computer, a game machine for household use, a game machine for commercial use, etc., and includes a control apparatus 2, a camera 3, and an external input unit 4 (an operation button, an operation lever, a keyboard, or the like). The control apparatus 2 includes, as indicated by the solid lines in FIG. 1, an image processor 6, on image recognizer 7, a data storage 8, a registration controller 9, a game environment arranger 10, a game controller 11, a personal information generator/writer 12, and a game monitor 13.

In the first embodiment, for example, the camera 3 is disposed at a position which allows the face of a game player to be captured when the game player faces the game machine 1 to play the game, and a video signal for the face of the game player, captured by the camera 3, is output from the camera 3 to the image processor 6 as ID information of the game player. The camera 3 may be fixed, or may be allowed to move as a whole or may be rotated at an angle so that the position and direction of the camera 3 can be automatically controlled so as to suitably capture the face of the game player.

The image processor 6 processes the video signal, received from the camera 3, according to a predetermined control algorithm for image processing, and outputs the processed face information of the game player to the image recognizer 7. Since there are various methods available for processing a video signal of a camera, any of which may be employed in the first embodiment, the descriptions thereof will be omitted.

The data storage 8 stores face information of registered game players. The image recognizer 7 compares the processed face information of the game player, received from the image processor 6, against the face information of the game players registered in the data storage 8, to thereby determine whether any face information coincident with the processed face information of the game player is stored in the data storage 8, thereby determining whether the game player captured by the camera 3 is a registered game player. Based on the determined result, if the game player captured by the camera 3 (i.e., the game player who is starting the game) is found to be an unregistered game player, the image recognizer 7 outputs a non-registration signal.

When the non-registration signal is output, the registration controller 9 writes and registers in the data storage 8 the face information of the game player, captured by the camera 3 and processed by the image processor 6, in association with ID information which is unique to the game player. Also, for example, the registration controller 9 may, as required, display predetermined instructions, such as for entering a name, on a display (not shown) of the game machine 1, so that information which is input by the user in accordance with the instructions on the screen using the external input unit 4 is registered in association with the face information of the user.

When the registration operation as described above is complete, the registration controller 9 outputs a registration completion signal to the game controller 11.

When the game player captured by the camera 3 is found to be a registered game player, the image recognizer 7 outputs to the game environment arranger 10 the ID information which is associated with the face information of the game player and which is unique to the game player. Since there are various methods available for the image recognizer 7 to individually identify the game player, any of which may be employed in the first embodiment, the descriptions thereof will be omitted.

In the first embodiment, the camera 3, the image processor 6, and the image recognizer 7 constitute a player identifier for individually identifying a game player based on the video information of a face which serves as the ID information of the game player.

The data storage 8 stores the following personal information of the game player in association with the ID information which is unique to the game player. The personal information is information regarding the individual game player and relates to the game to be played on the game machine 1. For example, if a plurality of levels is provided in the game, at least, information regarding the skill level of the game player is stored in the data storage 8 as the personal information.

In the case of a game in which various scenes appear as the game proceeds, such as a role-playing game, at least, information regarding the game progress status of the game player is stored in the data storage 8 as the personal information. In the case of a game using tokens, such as a slot game, at least, information regarding the number of acquired tokens is stored in the data storage 8 as the personal information. In the case of a raising game in which fish, race horses, etc. are raised, at least information regarding the raising progress status is stored in the data storage 8 as the personal information.

When the ID information of the game player is input from the image recognizer 7 to the game environment arranger 10 as described earlier, the game environment arranger 10 reads out the personal information of the game player from the data storage based on the received ID information of the game player. The game environment arranger 10 sets up a game environment in accordance with the personal information which has been read out, and after completion of the setup, outputs an environment setup completion signal to the game controller 11.

The game controller 11 is provided in advance with a game controlling program. Upon detecting an input of the environment setup completion signal from the game environment arranger 10 or an input of the registration completion signal from the registration controller 9, the game controller 11 starts the game, and controls the game according to the game controlling program based on information regarding operations of the external input unit 4 by the game player.

The game monitor 13 monitors, during the game, the game playing status of the game player according to the control operation of the game controller 11. The personal information generator/writer 12 is provided in advance with a program for automatically generating personal information of the game player using the monitoring information from the game monitor 13. The personal information generator/writer 12 automatically generates the personal information of the game player according to the program for automatically generating the personal information, based on the monitoring information from the game monitor 13. The method of generating personal information may vary depending on the type of personal information to be generated, and even the same type of personal information may be generated by various methods. In the first embodiment, the method of generating personal information is not limited and various methods may be employed, so the description thereof will be omitted.

The personal information generator/writer 12 stores in the data storage 8 the personal information, which has been generated in the above-described manner, in association with the ID information which is unique to the game player.

When the personal information is stored, if personal information based on the previous game played by the game player has been stored in the data storage 8, the personal information of the game player which has been stored may be overwritten with the newly generated personal information, or the newly generated personal information may be stored separately from the existing personal information. Alternatively, the configuration may be such that the game player is allowed to select either the overwrite or the separate storage using the external input unit 4, so that the personal information is stored in the data storage 8 in accordance with the storage method selected by the game player.

If, as described above, the newly generated personal information of the game player is stored in the data storage 8 separately from the existing personal information of the game player, multiple sets of personal information of the same game player are stored in the data storage 8. In that case, for example, the game environment arranger 10 may automatically set up a game environment based on the latest personal information stored in the data storage 8, or let the game player select a desired set of personal information from the multiple sets of personal information stored in the data storage 8 and automatically set up a game environment based on the selected personal information.

According to the first embodiment, the game machine 1 is provided with a player identifier constituted of the camera 3, the image processor 6, and the image recognizer 7, so that based on personal information of a game player identified by the player identifier, a game environment suitable for the game player is automatically set up; thus, the game player is saved the trouble of manually getting up a game environment each time the game player starts the game. Accordingly, the game player is allowed to start the game without the trouble of setting up a game environment, thus being allowed to play the game with more ease.

Furthermore, the first embodiment, in which image recognition techniques are used as means for performing personal identification, solves the following problems. For example, if the personal identification of the game player is performed using an ID card, more specifically, if an ID card is provided, on which information for individually identifying the game player is written, the game player, before starting the game, inserts the ID card into a card insertion slot of the game machine 1 so that the game machine 1 reads the information on the ID card, and the game machine 1 performs the personal identification based on the information which has been read, the game player needs to carry the ID card, and the problem that the personal information of the game player is not allowed to be retrieved due to damage to or loss of the ID card may occur.

Furthermore, if the game machine 1 is of the type which uses tokens, the problem of unfair act involving counterfeit cards may occur, i.e., the game may be unfairly played with a counterfeit ID card.

When personal identification is performed using image recognition techniques, as in the first embodiment, the ID card or a similar keyword medium for performing personal identification is not required. Thus, there is no need to carry the ID card, and the problem due to damage to or loss of the ID card is avoided. Furthermore, because personal identification is based on an image of a human face, etc., the unfair act of playing the game in place of another person is substantially prohibited.

As means for personal identification, fingerprints may also be used; however, fingerprint recognition may raise unpleasant feeling considering the social background. When personal identification is performed using image recognition techniques, as in the first embodiment, personal identification can be performed without causing such unpleasant feeling.

Furthermore, in the first embodiment, the configuration is such that personal information is automatically generated in accordance with the game play status of the game player and stored in the data storage 8. Accordingly, the game player is saved the trouble of manually entering his own personal information, for example, when exiting the game.

A second embodiment will be described below. A game machine 1 in the second embodiment is directed to a game machine which allows the playing of multi-player games such as shogi and combat sports games, and is characterized by comprising a level determiner 15, indicated by a dashed line in FIG. 1, in addition to the construction of the first embodiment. In the description of the second embodiment, components which are identical as in the first embodiment are designated by the same reference numbers, and the repeated description of the common components will be refrained.

The level determiner 15, which characterizes the second embodiment, receives the monitoring information from the game monitor 13, and determines a skill level of the game player based on the received information. The skill level may be determined by various methods. For example, when winning against an opponent, it is determined that the skill level of the game player is higher than that of the opponent. Also, by monitoring the game status, the skill level of the game player may be comprehensively determined based on various information including techniques and strategies. As described above, there are various methods available of determining the skill level of the game player. The method of determining the skill level is not limited herein, and any of the methods may be employed.

The level determiner 15 outputs the result of the level determination to the personal information generator/writer 12. The personal information generator/writer 12 automatically generates the personal information of the game player based on the received result of the level determination, and stores the generated personal information in the data storage 8 in association with the ID information of the game player.

The game machine 1 in the second embodiment allows the playing of multi-player games as mentioned earlier, and information of one or more opponents is stored in advance in the data storage 8 on a basis of a plurality of game levels. In the second embodiment, when a game player, whose level information is already stored in the data storage 8 as personal information, is starting the game, the game environment arranger 10, based on the level information of the game player, selects and reads out information of an opponent in accordance with the skill level of the game player, automatically setting up a game environment.

According to the second embodiment, the game machine 1 for multi-player games is provided with the level determiner 15, which automatically determines the skill level of the game player, and the level information is stored in the data storage 8 as personal information of the game player, so that, when the same game player starts the game next time, an opponent in accordance with the skill level of the game player is automatically selected to set up a game environment. Accordingly, the game player is automatically allowed to compete with an opponent in accordance with his own level without the trouble of setting up an opponent.

Although in the second embodiment, the configuration is such that an opponent is automatically selected in accordance with the skill level of the game player to set up a game environment, obviously, in addition to the construction of the second embodiment, function may be provided so that the game player is allowed to select an opponent by himself using the external input unit 4.

A third embodiment will be described below. The third embodiment is characterized in that a plurality of game machines 1 are connected via wires or wirelessly, and each of the game machines 1 which are signal connected comprises an information communicator 18 for exchanging information, as indicated by a dotted line in FIG. 1. The construction is otherwise identical to the above-described embodiments. In the description of the third embodiment, components identical as in the above-described embodiments are designated by the same reference numbers, and repeated description of the common components will be refrained.

In the third embodiment, the plurality of game machines 1 (specifically, for example, among personal computers as game machines, among game machines for household use, among game machines for commercial use, and among personal computers and game machines for household use) are connected via wires or wirelessly, via a dedicated signal communications network, the telephone communications network, the Internet communications network, etc.

The plurality of game machines 1 which are signal connected may be disposed adjacent to one another, or disposed remotely from one another. For example, in the case of game machines for commercial use, the plurality of game machines 1 for commercial use which are signal connected may be disposed adjacent to one another in the same game center, or disposed remotely from one another in, for example, different game centers.

Upon detecting that the game player has issued, using the external input unit 4, an instruction that his self personal information be read out from a different game machine 1, the information communicator 18 sends a request for the personal information to the game machine 1 at the destination of the request. Upon detecting an input of a request for personal information of a game player transmitted from another game machine 1, the information communicator 18 reads out the personal information of the game player from the data storage 8, and returns the information which has been read to the game machine 1 at the source of the request for personal information.

Furthermore, when personal information of the game player is received from another game machine 1, the information communicator 18 writes and stores the personal information of the game player in the data storage 8 in association with the ID information which is unique to the game player.

According to the third embodiment, personal information of the game player can be exchanged among a plurality of game machines 1. Accordingly, an optimal game environment for the game player can be automatically set up on any of the game machines 1 which allows exchange of personal information. In other words, the problem that a game environment which is different from the skill level of the game player is set up, for example, due to level information of the game player being old, is prevented. Accordingly, the game player is allowed to play the game more enjoyably.

Furthermore, if the function of communicating information, as in the third embodiment, is not provided, since the game player is assumed to enjoy playing the game on a dedicated game machine 1 in which his self personal information is stored, if, for example, the game machine 1 is occupied by another person, the game player is not allowed to play the game and will feel dissatisfied. By providing the communications function as in the third embodiment, the personal information of the game player can be exchanged, solving the problem of the dedicated use of the game machine 1.

A fourth embodiment will be described below. The fourth embodiment deals with a network system for setting up a game environment for a game machine. In the description of the fourth embodiment, components which are identical as in the above-described embodiments are designated by the same reference numbers, and the repeated description of the common components is refrained.

Figure 2:
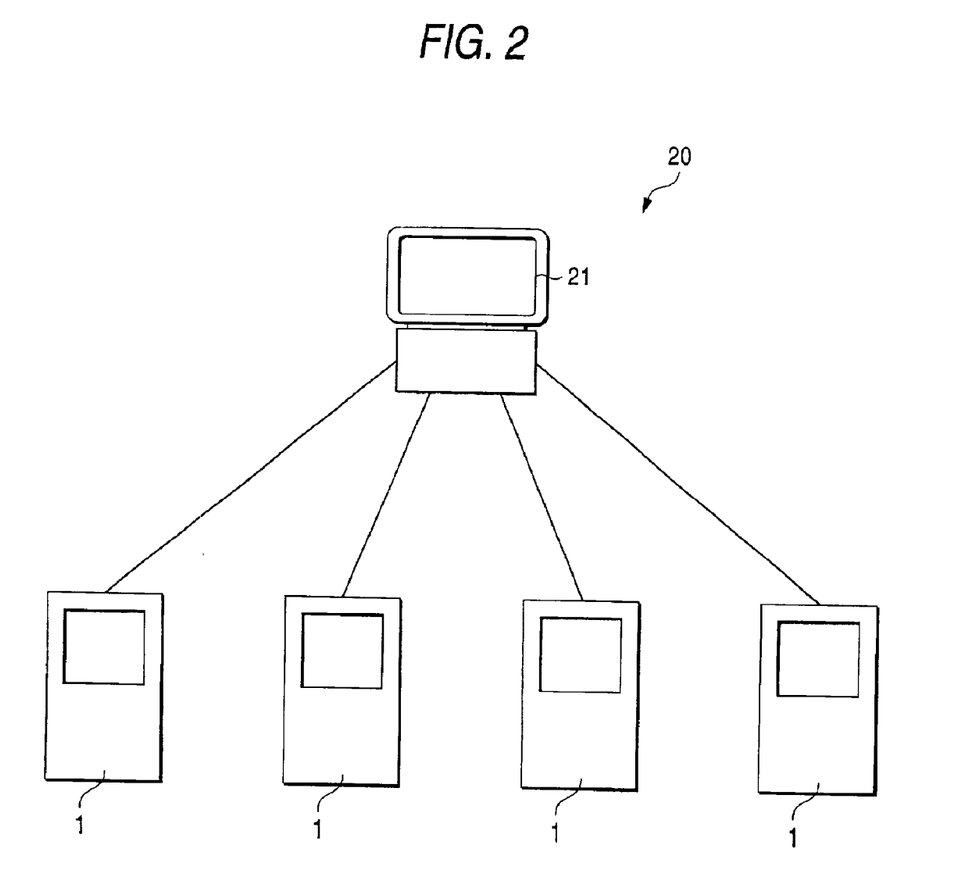
FIG. 2 is a diagram schematically showing a network system for setting up a game environment of a game machine, according to a fourth embodiment of the invention.

As shown in FIG. 2, in a network system 20 for setting up a game environment of a game machine, according to the fourth embodiment, the configuration is such that a plurality of game machines 1 are connected via wires or wirelessly to a common host apparatus 21, with the personal information of the game player, described earlier, stored in the host apparatus 21, so that the personal information of the game player will be delivered to a game machine 1 on which the game player plays the game. As required, the game machines 1 may be directly or indirectly signal connected to one another.

Figure 3:
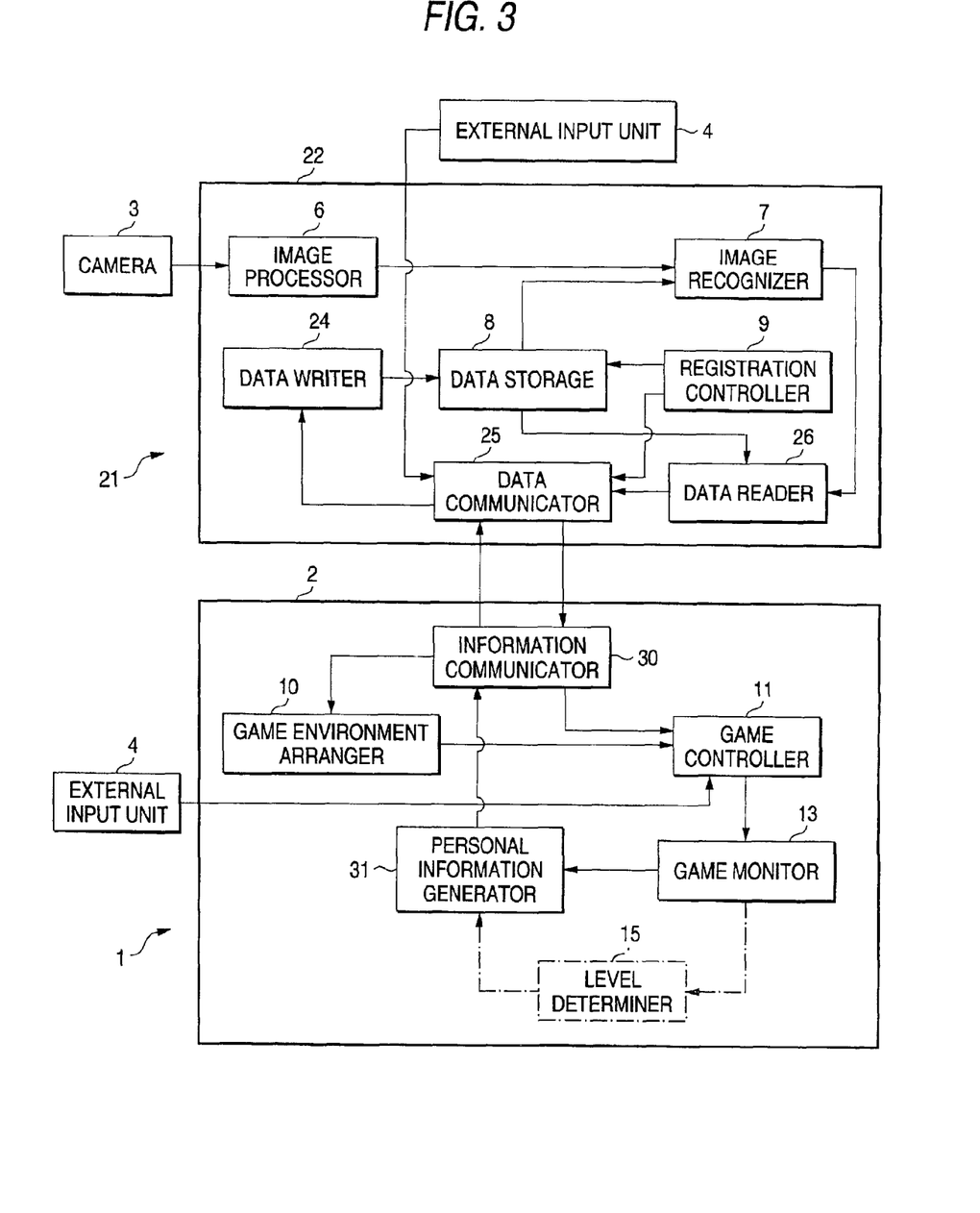
FIG. 3 is a block diagram showing essential components of the network system.

More specifically, the host apparatus 21 is provided, for example, at the reception desk, etc. of a game center, and as shown in FIG. 3, includes a camera 3, an external input unit 4, and a control apparatus 22. The control apparatus 22 includes an image processor 6, an image recognizer 7, a data storage 8, a registration controller 9, a data writer 24, a data communicator 25, and a data reader 26.

Each of the game machines 1 includes a control apparatus 2 and an external input unit 4. The control apparatus includes an game environment arranger 10, a game controller 11, a game monitor 13, an information communicator 30, and a personal information generator 31.

In the host apparatus 21 in the fourth embodiment, the camera 3 is disposed so as to capture the face of a game player when the game player is at a predetermined position. A video signal of the face of the game player, captured by the camera 3, is processed by the image processor 6. The image recognizer 7, based on the processed face information of the game player and information stored in the data storage 8, determines whether the game player captured by the camera 3 is already registered, and if not, outputs a non-registration signal. Similarly to the above-described embodiments, when the non-registration signal is output, the registration controller 9 registers the game player, and when the registration is complete, a registration completion signal is output to the data communicator 25.

If it is found, as result of the personal identification by the image recognizer 7, that the game player captured by the camera 3 is already registered, the image recognizer 7 outputs ID information of the game player to the data reader 26. The data reader 26, based on the received ID information of the game player, reads out the personal information of the game player from the data storage 8 and outputs to the data communicator 25.

In the fourth embodiment, the configuration is such that, as described earlier, the personal information of the game player can be delivered from the host apparatus 21 to the plurality of game machines 1, and the personal information of the game player may include information of the game player, in relation to various games, for example, level information, information regarding the progress status of the game, information regarding the number of acquired tokens, information regarding the growth status in raising games, etc. In that case, the data reader 26 may read out all the personal information of the game player from the data storage 8, or may read out only selected information of the personal information from the data storage 8.

The data communicator 25, upon receiving the registration completion signal from the registration controller 9 or receiving the personal information of the game player from the data reader 26, transmits the registration completion signal or the personal information to a game machine designated in accordance with, for example, the operation information from the external input unit 4.

The information communicator 30 of the game machine 1, upon receiving the registration completion signal from the host apparatus 21, outputs the registration completion signal to the game controller 11. Also, the information communicator 30, upon receiving the personal information from the host apparatus 21, outputs the personal information to the game environment arranger 10.

The game environment arranger 10, upon detecting an input of the personal information from the information communicator 30, automatically sets up a game environment in accordance with the personal information which has been input, and when the setup of the game environment is complete, outputs an environment setup completion signal to the game controller 11.

Upon receiving the registration completion signal from the information communicator 30 or the environment setup completion signal from the game environment arranger 10, the game controller 11, similarly to the above-described embodiments, starts the game, and based on the operation information from the external input unit 4, controls the game according to a predetermined game controlling program.

The game monitor 13, similarly to the above-described embodiments, monitors, during the game, the game status of the game player according to the control operation of the game controller 11. The personal information generator 31, based on the monitoring information from the game monitor 13, automatically generates personal information of the game player according to a predetermined algorithm for automatic generation of personal information.

If the game machine 1 is a game machine for playing multi-player games, the configuration may be such that an level determiner 15, as in the second embodiment, is provided so that the personal information generator 31 generates personal information of the game player based on the skill level automatically determined by the level determiner 15.

The personal information generated by the personal information generator 31 is output to the information communicator 30. The information communicator 30 outputs the personal information to the host apparatus 21 in association with the ID information which is unique to the game player.

The data communicator 25 of the host apparatus 21, upon receiving personal information newly generated by the game machine 1, outputs the personal information to the data writer 24. The data writer 24 stores the personal information in the data storage 8 in association with the ID information of the game player.

Similarly to the above-described embodiments, the storage in the data storage 8 may overwrite the personal information of the game player which has already been registered, or may be separate from the existing personal information, or the game player may select by himself either the overwrite storage or the separate storage so that the new personal information is stored in the data storage 8 by the selected storage method.

When the newly generated personal information is stored separately from the existing personal information as described above, multiple sets of personal information of the same game player are stored in the data storage 8. In that case, all the personal information of the game player individually identified may be output to a designated game machine 1, or only the information selected from the multiple sets of personal information using the external input unit 4 may be output to the designated game machine 1. Any appropriate predetermined method may be employed as the method of transmitting the personal information.

According to the fourth embodiment, the network system 20 for setting up a game environment of a game machine is implemented; thus, personal information of the same game player can be stored unitarily without being distributed among a plurality of game machines. Also, for example, if a plurality of game machines 1 of the same type is provided in a game center, game players can be allocated to the game machines 1 as desired, achieving equivalent operation rates of the game machines 1 of the same type.

Although in the network system for setting up a game environment of a game machine, in the fourth embodiment, a player identifier, constituted of the camera 3, the image processor 6, and the image recognizer 7, is provided in the host apparatus 21, the player identifier may be provided in each of the game machines 1. In that case, the game machine 1, when the game player is identified by a built-in player identifier, reads out the personal information of the identified game player from the data storage 8 of the host apparatus 21, and similarly to the above, automatically sets up a game environment suitable for the game player. Also, the player identifier may be provided both the side of the host apparatus 21 and the side of the game machine 1.

The present invention is not limited to the above-described embodiments, and may be embodied in various forms. For example, although personal image recognition is implemented using an image of the face of a game player in the above-described embodiments, the personal image recognition may be implemented, for example, using an image of the upper half of the body or the entire body. Furthermore, although only one camera 3 is provided in the above-described embodiments, a plurality of cameras 3 may be provided so that the game player will be captured from different angles.

Furthermore, although personal identification is implemented using image recognition techniques in the above-described embodiments, techniques for implementing the personal identification are not limited to image recognition. For example, the game player may be individually identified using a password.

Furthermore, although the game status of the game player is monitored during the game, and personal information of the game player is automatically generated based on the monitoring information in the above-described embodiments, alternatively to the automatic generation of personal information, for example, personal information may be generated by manual operations. For example, the configuration may be such that instructions for generating the personal information are displayed on a display screen, and the game player operates on the external input unit 4 in accordance with the instructions on the display screen to generate the personal information by himself.

Furthermore, as examples of application of the above-described embodiments, the following extension is possible. For example, a plurality of game machines 1 for playing multi-player games are signal-connected so that, as in the third and fourth embodiment, the game machines 1 are allowed to exchange information with one another. Furthermore, since the game machines 1 in the above-described embodiments individually identify the game player, the plurality of game machines 1 signal connected to one another are allowed, using the personal ID information, to exchange information for mutually notifying who is playing the game thereon, so that based on the notification information of the game players, the game can be played with a designated game player via a communicative connection. Such a network of the game machines 1 for multi-player games may be implemented.

Furthermore, when the configuration is such that the game can be played with other game players via a communicative connection, a match canceller may be provided, so that the game player is allowed to predefine, using the external input unit 4, information regarding opponents with whom the game player is not willing to compete, not accepting requests for matches from the undesired opponents.

Furthermore, the constructions characterizing the above-described embodiments may be provided on game machines such as personal computers, game machines for household use, game machines for commercial use, etc. which allow the playing of network games on the Internet, so that the advantage of automatically setting up a game environment is applied to the network games on the Internet as well.

For example, although the fourth embodiment has been described in relation to an example in which a network system for setting up a game environment of a game machine is implemented in a single game center, the configuration may be such that a server apparatus storing a program, etc. for a network game on the Internet serves as the host apparatus, the host apparatus (the server apparatus) and the game machines (game machines for household use, personal computers, and game machines for commercial use) being communicatively connected using the Internet communications network.

In that case, game machines separately disposed at various locations can be communicatively connected to a common host apparatus. Thus, the game player is allowed to start the game comfortably on any game machine with a game environment suitable for himself automatically set up, as long as the game machine is communicatively connected to the host apparatus.

Furthermore, although the server apparatus storing a game program serves as the host apparatus in the above example, for example, the configuration may be such that a computer, which is allowed to establish connection with the server apparatus using the Internet communications network, serves as the host apparatus, the host apparatus and each of the game machines being signal connected via the server apparatus using the Internet.

Although the present invention has been shown and described with reference to specific preferred embodiments various changes and modifications will be apparent to those skilled in the art from the teachings herein. Such changes and modifications as are obvious are deemed to come within the spirit, scope and contemplation of the invention as defined in the appended claims.

What is claimed is:

1. A game machine comprising:
    a player identifier, which identifies a player who wants to play a game;
    a data storage, which stores personal information of a plurality of players which have played the game, the data storage being operable to store a plurality of personal information sets for each of said plurality of players, each personal information set including information regarding a same parameter of play of the game; and
    a game environment arranger, which selectively reads out one of the personal information sets of the player identified by the player identifier from the data storage, and automatically sets up a game environment of the game based on the read out personal information set;
    wherein the player identifier identifies the player using image recognition techniques.

2. The game machine as set forth in claim 1, further comprising:
    a game monitor, which monitors status of the game played by the player to generate monitoring information; and
    a personal information generator, which generates new personal information of the player based on the monitoring information, and stores the new personal information in the data storage.

3. The game machine as set forth in claim 2, further comprising:
    a level determiner, which automatically determines a skill level of the player to generates skill level information, based on the monitoring information,
    wherein the personal information generator incorporates the skill level information to the personal information; and
    wherein the game environment arranger automatically reads out personal information of another player stored in the data storage as an opponent in a multi-player game, based on the skill level information of the player.

4. The game machine as set forth in claim 3, further comprising a match canceller which refuses to establish the multi-player game with the opponent selected by the game environment arranger.

5. The game machine as set forth in claim 1, further comprising:
    an information communicator, which communicates the personal information stored in the data storage with another game machine connected to the game machine.

6. The game machine as set forth in claim 1, wherein the personal information includes at least one of information regarding a skill level of the player, information regarding progress status of the game, information regarding a number of tokens acquired in the game, and information regarding growth status in a raising game.

7. A network system for setting up a game environment, comprising:
    a common host apparatus;
    a plurality of game machines communicatively connected to the host apparatus;
    a player identifier, which is provided in at least one of the host apparatus and game machines, and identifies a player who wants to play a game, the player identifier provided;
    a data storage, which is provided in the host apparatus, and stores personal information of a plurality of players which have been played the game, the data storage being operable to store a plurality of personal information sets for each of said plurality of players, each personal information set including information regarding a same parameter of play of the game;
    a data communicator, which is provided in the host apparatus, and selectively transmits one of the personal information items of the player identified by the player identifier, from the data storage to at least one of the game machines; and
    a game environment arranger, which is provided in the respective game machines, receives the personal information transmitted from the host apparatus, and automatically sets up a game environment of the game based on one of the personal information sets;
    wherein the player identifier identifies the player using image recognition techniques.

8. The network system as set forth in claim 7, wherein each of the game machine includes:
    a game monitor, which monitors status of the game played by the player to generate monitoring information;
    a personal information generator, which generates new personal information of the player based on the monitoring information; and
    an information communicator, which transmits the new personal information to the data storage in the host apparatus.

9. The network system as set forth in claim 8, wherein each of the game machines includes a level determiner, which automatically determines a skill level of the player to generates skill level information, based on the monitoring information;
    wherein the personal information generator incorporates the skill level information to the personal information; and
    wherein the game environment arranger automatically receives personal information of another player stored in the data storage as an opponent in a multi-player game, based on the skill level information of the player.

10. The game machine as set forth in claim 9, further comprising a match canceller which refuses to establish the multi-player game with the opponent selected by the game environment arranger.

11. The network system as set forth in claim 7, wherein the host apparatus and the respective game machines are connected via a wide area computer network to play a network game provided on the wide area computer network.

12. The network system as set forth in claim 7, wherein the personal information includes at least one of information regarding a skill level of the player, information regarding progress status of the game, information regarding the number of tokens acquired in the game, and information regarding growth status in a raising game.

13. A game machine comprising:
    a player identifier, which identifies a player who wants to play a game;
    a data storage, which stores personal information of a plurality of players which have played the game, the data storage being operable to store a plurality of personal information sets for each of said plurality of players, each personal information set including information regarding a same parameter of play of the game; and a game environment arranger, which selectively reads out one of the personal information sets of the player identified by the player identifier from the data storage, and automatically sets up a game environment of the game based on the read our personal information set.

14. A network system for setting up a game environment, comprising:

a common host apparatus;

a plurality of game machines communicatively connected to the host apparatus;

a player identifier, which is provided in at least one of the host apparatus and game machines, and identifies a player who wants to play a game, the player identifier provided;

a data storage, which is provided in the host apparatus, and stores personal information of a plurality of players which have been played the game, the data storage being operable to store a plurality of personal information sets for each of said plurality of players, each personal information set including information regarding a same parameter of play of the game;

a data communicator, which is provided in the host apparatus, and selectively transmits one of the personal information items of the player identified by the player identifier, from the data storage to at least one of the game machines; and a game environment arranger, which is provided in the respective game machines, receives the personal information transmitted from the host apparatus, and automatically sets up a game environment based on one of the personal information sets;

wherein the player identifier identifies the player using image recognition techniques.

* * * * *